US006274658B1

(12) United States Patent
Hara

(10) Patent No.: US 6,274,658 B1
(45) Date of Patent: Aug. 14, 2001

(54) ADDITION-CURABLE SILICONE RUBBER COMPOSITION

(75) Inventor: Hiroyasu Hara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/451,085

(22) Filed: Nov. 30, 1999

(30) Foreign Application Priority Data

Nov. 30, 1998 (JP) .................................................. 10-339834

(51) Int. Cl.⁷ ...................................................... C08K 5/10
(52) U.S. Cl. ........................... 524/288; 524/290; 524/306; 524/311; 524/287; 524/299; 524/300; 524/308; 524/321; 524/588
(58) Field of Search ..................................... 524/290, 306, 524/311, 288, 299, 588, 287, 300, 320, 321, 308

(56) References Cited

U.S. PATENT DOCUMENTS

| | | |
|---|---|---|
| 3,445,420 | 5/1969 | Kookootsdes et al. . |
| 4,023,977 * | 5/1977 | Mercurio et al. ...................... 106/178 |
| 4,511,715 | 4/1985 | Palensky et al. . |
| 4,603,215 | 7/1986 | Chandra et al. . |
| 4,778,860 * | 10/1988 | Morita et al. ......................... 525/431 |
| 4,785,066 | 11/1988 | Maxson . |
| 5,004,792 | 4/1991 | Maxson . |
| 5,037,932 | 8/1991 | Maxson . |
| 5,153,238 * | 10/1992 | Bilgrien et al. ....................... 523/211 |
| 5,312,855 * | 5/1994 | Okami ................................... 524/290 |
| 5,334,687 | 8/1994 | Ikeno . |
| 5,668,225 * | 9/1997 | Okazaki et al. ...................... 525/478 |

FOREIGN PATENT DOCUMENTS 257 970    3/1988 (EP) .

* cited by examiner

Primary Examiner—Margaret G. Moore
(74) Attorney, Agent, or Firm—Pillsbury Winthrop LLP

(57) ABSTRACT

An addition-curable silicone rubber composition comprising (A) an organopolysiloxane containing in one molecule at least two alkenyl groups bonded to silicon atoms, (B) an organohydrogenpolysiloxane containing in one molecule at least two hydrogen atoms bonded to silicon atoms, (C) a platinum catalyst and (D) a (meth)acrylate compound having a melting point of 40° C. or above. This composition has both a good storage stability and a rapid-curing performance in a well balanced state, and hence has a high workability and contributes to an improvement in productivity.

11 Claims, No Drawings

ADDITION-CURABLE SILICONE RUBBER COMPOSITION

BACKGROUND OF THE INVENTION

1. Field of the Invention

This invention relates to a one-part or two-part, addition-curable silicone rubber composition having both a sufficient storage stability and a rapid-curing performance.

2. Description of the Prior Art

Addition-curable silicone rubber compositions making use of platinum or platinum compounds as curing catalysts have a good curing performance and also, as materials, they are r adaptable to both the millabe type and the liquid type. Hence, they are used for various purposes. In particular, the liquid-type ones are useful as adhesives, impression materials, LIMS materials and so forth. In either type, the composition may be mixed and/or heated to accelerate cross-linking reaction, thus a rubbery cured product can be obtained.

In the case of the one-part type, usually a cure retarding agent i.e. addition reaction (hydrosilylation reaction) inhibitor is compounded in order to ensure the storage stability of compositions (for a storage time before use), and hence they must be heated to make it cure. In such an instance, high-temperature heating is desirable for accelerating the curing. When the high-temperature heating is not applicable for some reasons, the compositions can not help being heated for a long time at a low temperature. When such long-time heating is improper, the two-part type can not help being used. Thus, it is desired for the one-part type to have a sufficient storage stability and also to be curable in a short time even at a low temperature.

In the case of the two-part type also, it is desired for them to have a sufficient storage stability and also to be curable in a short time at a low temperature.

Accordingly, studies have been made in variety on the both types so as to obtain curable compositions having both the sufficient storage stability and the rapid-curing performance in a well balanced state. Especially on the one-part type compositions, studies have been made in variety using vinyl-containing siloxanes, phosphorus compounds, nitrogen compounds or acetylene alcohols as cure retarding agents.

However, any addition-curable silicone rubber composition having both the sufficient storage stability and the rapid-curing performance in a well balanced state have not been obtained in the both cases of one-part type and two-part type.

SUMMARY OF THE INVENTION

Accordingly, an object of the present invention is to provide an addition-curable silicone rubber composition having both the sufficient storage stability and the rapid-curing performance in a well balanced state.

As a means for achieving such an object, the present invention provides an addition-curable silicone rubber composition comprising;

(A) an organopolysiloxane containing in one molecule at least two alkenyl groups bonded to silicon atoms, represented by the average compositional formula (1):

$$R^1_a R^2_b SiO_{(4-a-b)/2}$$

wherein $R^1$ represents a substituted or unsubstituted monovalent hydrocarbon group containing no aliphatic unsaturated bond; $R^2$ represents an alkenyl group; and a is a number ranging from 0.96 to 2.00, b is a number ranging from 0.0001 to 0.5, and a and b satisfy a +b =1.90 to 2.04;

(B) an organohydrogenpolysiloxane containing in one molecule at least two hydrogen atoms bonded to silicon atoms, represented by the average compositional formula (2):

$$R^3_c H_d SiO_{(4-c-d)/2}$$

wherein $R^3$ represents a substituted or unsubstituted monovalent hydrocarbon group containing no aliphatic unsaturated bond; and c is a number ranging from 0.70 to 2.0, d is a number ranging from 0.005 to 1.0, and c and d satisfy c+d=0.8 to 3.0;

(C) a platinum catalyst; and (D) a (meth)acrylate compound having a melting point of 40° C. or above.

The composition of the present invention may optionally further contain (E) an acetylene alcohol compound or an acetylene alcohol compound the alcoholic hydroxyl group (C—OH) of which has been modified with a silane or siloxane.

DESCRIPTION OF THE REFERRED EMBODIMENTS

The present invention will be described below in greater detail.

(A) Organopolysiloxane:

The component-(A) organopolysiloxane is a compound having in one molecule at least two alkenyl groups bonded to silicon atoms, represented by the average compositional formula (1): $R^1_a R^2_b SiO_{(4-a-b)/2}$ This is used as a base polymer. There are no particular limitations on the molecular structure of this organopolysiloxane. It may have any of straight-chain, branched-chain, cyclic and three-dimensional network structures. It may also be a polymer formed of single siloxane units or a copolymer formed of two or more types of siloxane units. In usual instances, it is commonly a straight-chain diorganopolysiloxane whose molecular chain is terminated with triorganosiloxyl groups at both terminals and backbone chain is substantially formed of the repetition of diorganosiloxane units. Also, the alkenyl groups in the molecule may be groups bonded to either silicon atoms at molecular chain terminals or silicon atoms at some positions of the molecular backborn chain, or may be groups bonded to the both of these. In view of physical properties of cured products, it may preferably be one containing alkenyl groups bonded to at least the silicon atoms at the both molecular chain terminals.

In the average compositional formula (1), $R^1$'s may be the same or different, and each represent a substituted or unsubstituted monovalent hydrocarbon group containing no aliphatic unsaturated bond, having 1 to 12 carbon atoms, and preferably 1 to 8 carbon atoms. As specific examples of the group represented by $R^1$, it may include alkyl groups such as a methyl group, an ethyl group, a propyl group, an isopropyl group, a butyl group, a hexyl group, an octyl group and a dodecyl group; cycloalkyl groups such as a cyclopentyl group, a cyclohexyl group and a cycloheptyl group; aryl groups such as a phenyl group, a tolyl group, a xylyl group and a naphthyl group; aralkyl groups such as a benzyl group, a phenylethyl group and a phenylpropyl group; and any of these hydrocarbon groups at least part of hydrogen atoms of which has been substituted with a halogen atom such as a fluorine atom, a bromine atom or a chlorine atom or with a nitrile group to form substituted hydrocarbon groups, as exemplified by a trifluoropropyl group, a chloromethyl group and a cyanoethyl group. In particular, in view of readiness for synthesis and chemical stability, it is preferred that $R^1$'s are all methyl groups. If necessary in view of properties, part of the methyl groups may be substituted with a phenyl group or trifluoropropyl group.

$R^2$ represents an alkenyl group. As specific examples of the alkenyl group represented by $R^2$, it may usually include those having about 2 to 6 carbon atoms, such as a vinyl group, an allyl group, a propenyl group, an isopropenyl group, a butenyl group, a pentenyl group, an hexenyl group and a cyclohexenyl group. The vinyl group and allyl group are preferred. In view of readiness for synthesis and chemical stability, the vinyl group is more preferred.

Letter symbol a is a number ranging from 0.96 to 2.00, and preferably from 1.8 to 2.00; b is a number ranging from 0.0001 to 0.5, and preferably from 0.001 to 0.1; and a and b satisfy a+b=1.90 to 2.04, and preferably 1.95 to 2.02.

This organopolysiloxane may usually have a viscosity at 25° C. of 10 cSt (centistokes) or above, preferably within the range of from 50 to 5,000,000 cSt, and more preferably from 100 to 1,000,000 cSt, in view of the flexibility of resulting cured products and the workability of compositions.

As typical examples of the component-(A) organopolysiloxane, it may include methylvinylsiloxane cyclic copolymers, methylvinylsiloxane-dimethylsiloxane cyclic copolymers, dimethylsiloxane-methylvinylsiloxane copolymers terminated with trimethylsiloxyl groups at both terminals of the molecular chain, methylvinylpolysiloxanes terminated with trimethylsiloxyl groups at both terminals of the molecular chain, dimethylsiloxane-methylvinylsiloxane-methylphenylsiloxane copolymers terminated with trimethylsiloxyl groups at both terminals of the molecular chain, dimethylpolysiloxanes terminated with dimethylvinylsiloxyl groups at both terminals of the molecular chain, methylvinylpolysiloxanes terminated with dimethylvinylsiloxyl groups at both terminals of the molecular chain, dimethylsiloxane-methylvinylsiloxane copolymers terminated with dimethylvinylsiloxyl groups at both terminals of the molecular chain, dimethylsiloxane-monomethylsiloxane copolymers terminated with dimethylvinylsiloxyl groups at both terminals of the molecular chain, dimethylsiloxane-methylvinylsiloxane-methylphenylsiloxane copolymers terminated with dimethylvinylsiloxyl groups at both terminals of the molecular chain, dimethylpolysiloxanes terminated with methyldivinylsiloxyl groups at both terminals of the molecular chain, dimethylpolysiloxanes terminated with trivinylsiloxyl groups at both terminals of the molecular chain, organopolysiloxane copolymers consisting of a siloxane unit represented by the formula: $R^1{}_3SiO_{1/2}$ (wherein $R^1$ has the same meaning as the $R^1$ in the average compositional formula (1); the same applies hereinafter), a siloxane unit represented by the formula: $R^1{}_2R^2SiO_{1/2}$ (wherein $R^2$ has the same meaning as the $R^2$ in the average compositional formula (1); the same applies hereinafter), a siloxane unit represented by the formula: $R^1{}_2SiO_{2/2}$ and a small amount of a siloxane unit represented by the formula: $SiO_{4/2}$, organopolysiloxane copolymers consisting of the $R^1{}_3SiO_{1/2}$ unit, the $R^1{}_2R^2SiO_{1/2}$ unit and the $SiO_{4/2}$ unit, organopolysiloxane copolymers consisting of the $R^1{}_2R^2SiO_{1/2}$ unit, the $R^1{}_2SiO_{2/2}$ unit and a small amount of the $SiO_{4/2}$ unit, organopolysiloxane copolymers consisting of an $R^1R^2SiO_{2/2}$ unit and a small amount of an $R^1SiO_{3/2}$ unit and/or an $R^2SiO_{3/2}$ unit, and organopolysiloxanes represented by the following structural formulas:

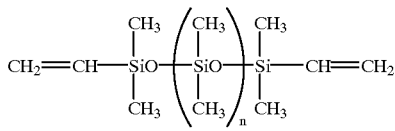

(n is an integer of 50 to 20,000)

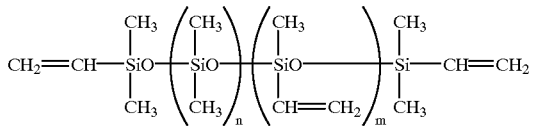

(n is an integer of 50 to 20,000, and m is an integer of 1 to 20)

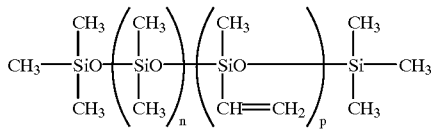

(n is an integer of 50 to 20,000, and p is an integer of 2 to 20);

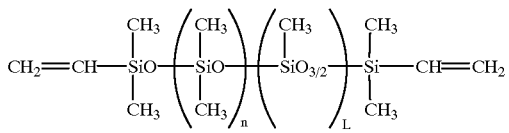

(n is an integer of 50 to 20,000, and L is an integer of 1 to 6); and

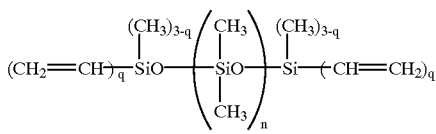

(n is an integer of 50 to 20,000, and q is an integer of 2 or 3).

Any of these alkenyl-group-containing organopolysiloxanes may be used alone or in combination of two or more.

(B) Organohydrogenpolysiloxane:

The component(B) organohydrogenpolysiloxane is a compound having in the molecule at least two, and preferably at least three, hydrogen atoms bonded to silicon atoms, and is represented by the average compositional formula (2): $R^3{}_cH_dSiO_{(4-c-d)/2}$. The hydrogen atoms bonded to silicon atoms (i.e., SiH groups) addition-reacts with the alkenyl groups bonded to silicon atoms in the component-(A) in the presence of the component-(D) platinum catalyst detailed later, to function as a cross-linking agent that imparts a three-dimensional network structure.

There are no particular limitations on the molecular structure of this organohydrogenpolysiloxane. It may have any of straight-chain, branched-chain, cyclic and three-dimensional network structures. For example, it may be a polymer formed of only siloxane units having SiH groups, or a copolymer formed of a siloxane unit having an SiH group and at least one unit selected from the group consisting of a triorganosiloxane unit, a diorganosiloxane unit, a monoorganosiloxane unit and a siloxane unit represented by the formula: $SiO_{4/2}$. There are no particular limitations also on the degree of polymerization. In view of compatibility with the component-(A) and readiness for synthesis, those having 3 to 300 silicon atoms, and particularly 4 to 150 silicon atom, are preferred.

In the average compositional formula (2), $R^1$'s may be the same or different, and each represent a substituted or unsubstituted monovalent hydrocarbon group containing no aliphatic unsaturated bond, having 1 to 12 carbon atoms, and preferably 1 to 8 carbon atoms. As specific examples of the group represented by $R^3$, it may be exemplified by the same ones as those exemplified for the $R^1$ in the average compositional formula (1). In view of readiness for synthesis and chemical stability, it is preferred that $R^3$'s are all methyl groups. If necessary in view of properties, part of the methyl groups may be substituted with a phenyl group or trifluoropropyl group. Letter symbol c is a number ranging from 0.70 to 2.0, and preferably from 0.9 to 2.0; d is a number ranging from 0.005 to 1.0, and preferably from 0.01 to 1.0; and c and d satisfy c+d=0.8 to 3.0, and preferably 1.0 to 2.5.

As typical examples of such a component-(B) organohydrogenpolysiloxane, it may include methylhydrogensiloxane cyclic copolymers, methylhydrogensiloxane-dimethylsiloxane cyclic copolymers, methylhydrogenpolysiloxanes terminated with trimethylsiloxyl groups at both terminals of the molecular chain, dimethylsiloxane-methylhydrogensiloxane copolymers terminated with trimethylsiloxyl groups at both terminals of the molecular chain, dimethylpolysiloxanes terminated with dimethylhydrogensiloxyl groups at both terminals of the molecular chain, dimethylsiloxane-methylhydrogensiloxane copolymers terminated with dimethylhydrogensiloxyl groups at both terminals of the molecular chain, dimethylsiloxane-methylhydrogensiloxane-diphenylsiloxane copolymers terminated with dimethylhydrogensiloxyl groups at both terminals of the molecular chain, dimethylsiloxane-diphenylsiloxane copolymers terminated with dimethylhydrogensiloxyl groups at both terminals of the molecular chain, methylhydrogensiloxane-diphenylsiloxane copolymers terminated with dimethylhydrogensiloxyl groups at both terminals of the molecular chain, methylhydrogensiloxane-diphenylsiloxane copolymers terminated with trimethylsiloxyl groups at both terminals of the molecular chain, methylhydrogensiloxane-diphenylsiloxane-dimethylsiloxane copolymers terminated with trimethylsiloxyl groups at both terminals of the molecular chain, copolymers consisting of an $(CH_3)_2HSiO_{1/2}$ unit and an $SiO_{4/2}$ unit, copolymers consisting of a $(CH_3)_3SiO_{1/2}$ unit, a $(CH_3)_2HSiO_{1/2}$ unit and an $SiO_{4/2}$ unit, copolymers consisting of a $(CH_3)_2HSiO_{1/2}$ unit, an $SiO_{4/2}$ unit and a $(C_6H)SiO_{3/2}$ unit, copolymers consisting of a $(CH_3)HSiO_{2/2}$ unit, a $(CH_3)SiO_{3/2}$ unit and/or an $HSiO_{3/2}$ unit, and organohydrogenpolysiloxanes represented by the following structural formulas:

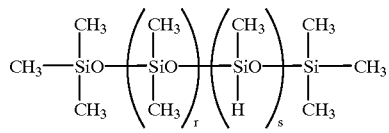

(r is an integer of 0 to 300, and s is an integer of 3 to 100); and

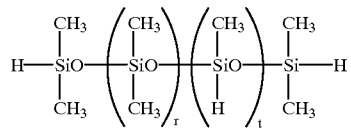

(r is an integer of 0 to 300, and t is an integer of 0 to 100).

Any of these organohydrogenpolysiloxanes may be used alone or in combination of two or more.

The component (B) may preferably be mixed in such an amount that, from the viewpoints of curing performance of compositions, non-intumescece at the time of curing, strength of cured products, stability with time of cured-product physical properties and so forth, the number of the hydrogen atoms bonded to silicon atoms (the SiH groups) in the component (B), or the number of the hydrogen atoms bonded to silicon atoms (the SiH groups) which are present in the whole organohydrogenpolysiloxane when any organohydrogenpolysiloxane(s) other than the component (B) is/are present, is from 0.4 to 10, and more preferably from 1.2 to 5.0, per one alkenyl group contained in the component-(A) inclusive of a high-density organohydrogenpolysiloxane (an organohydrogenpolysiloxane whose backbone chain consists of only the repetition of methylhydrogensiloxane units).

(C) Platinum Catalyst:

The component-(C) platinum catalyst is a catalyst for accelerating the addition reaction of the component-(A) alkenyl-group-containing, i.e., unsaturated-aliphatic-group-containing organopolysiloxane with the component-(B) organohydrogenpolysiloxane, and any known platinum catalysts may be used. Stated specifically, it is exemplified by platinum black, chloroplatinic acid, alcohol-modified products of chloroplatinic acid, and complexes of chloroplatinic acid with olefins, aldehydes, vinylsiloxanes or acetylene alcohols. The catalyst may be mixed in an effective quantity, which may appropriately be made large or small in accordance with the desired curing rate. Stated specifically, it may usually be in an amount ranging from 0.1 to 2,000 ppm, and preferably from 1 to 200 ppm, in terms of platinum metal based on the weight of the composition.

Taking account of the use of the composition, any corrosive components must be avoided from inclusion in some cases. In such cases, the platinum catalyst must also be made free of chloride ions, and the platinum catalyst may preferably be a zero-valent platinum complex having not more than 5 ppm of chlorine ions. As examples of such a platinum complex, it may include complexes of vinylsiloxanes with platinum as disclosed in, e.g., U.S. Pat. No. 3,715,334, No. 3,775,452 and No. 3,814,730.

(D) (Meth)Acrylate Compound:

In the present specification, the term (meth)acrylate compound is used to mean that it embraces acrylate compounds and methacrylate compounds.

The component-(D) (meth)acrylate compound is a component necessary for imparting a sufficient storage stability and a rapid-curing performance to the composition of the present invention. It may preferably be a compound having no organosiloxane structure in the molecule. Those having a melting point of 40° C. or above, usually from 40 to 180° C., and preferably from 60 to 150° C., are used.

The present inventors have discovered that, when the components (A) to (C) are used in combination with this (meth)acrylate compound (i.e., an acrylate compound and/or methacrylate compound; the same applies hereinafter), this compound dissolves in the siloxane components upon heating to unexpectedly make the activity of the platinum catalyst higher to improve the curing rate of the composition. Moreover, since the (meth)acrylate compound has a melting point of 40° C. or above, it does not stand dissolved in the siloxane components at normal temperature, and hence the activity of the platinum catalyst does not become higher, and the stability of the composition, i.e., the storage stability can be attained. Thus, the composition of the present invention can have both a sufficient storage stability and a rapid-curing performance in a well balanced state.

There are no particular limitations on the (meth)acrylate compound having the effect as described above, as long as it has a melting point of 40° C. or above. Preferred are those having a divalent to tetravalent, preferably divalent, hydrocarbon structure with approxymately 12 to approxymately 30 carbon atoms, which contains 1 to 4 aromatic ring(s) such as a phenylene ring(s), and particularly 1 or 2 aromatic ring(s) and which may contain an etheric oxygen atom, a silicon atom or a fluorine atom; the structure being as exemplified by the following.

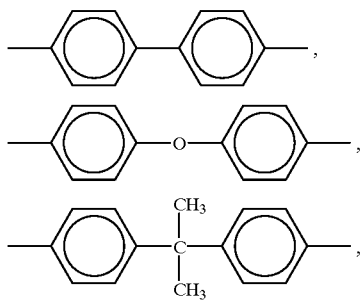

In particular, the (meth)acrylate compound may include those represented by the following general formula (3):

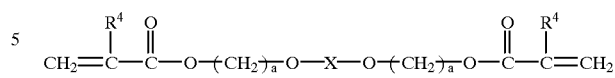

(3)

wherein $R^4$ represents a hydrogen atom or a methyl group; X represents a divalent hydrocarbon group containing 1 to 4 aromatic ring(s), and having 6 to 30, and preferably 12 to 20, carbon atoms, which may contain in the structure at least one atom selected from the group consisting of an oxygen atom, a silicon atom and a fluorine atom; and a represents an integer of 1 to 6, and preferably 2 to 4.

As specific examples of the ring(s) represented by X in the general formula (3), it or they may include the aromatic rings exemplified above.

As specific examples of the (meth)acrylate compound, it may include the following.

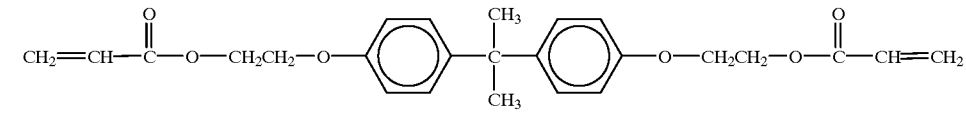

(melting point: 60° C.)

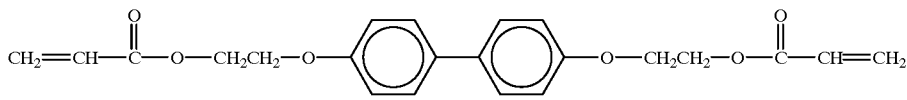

(melting point: 93° C.)

-continued

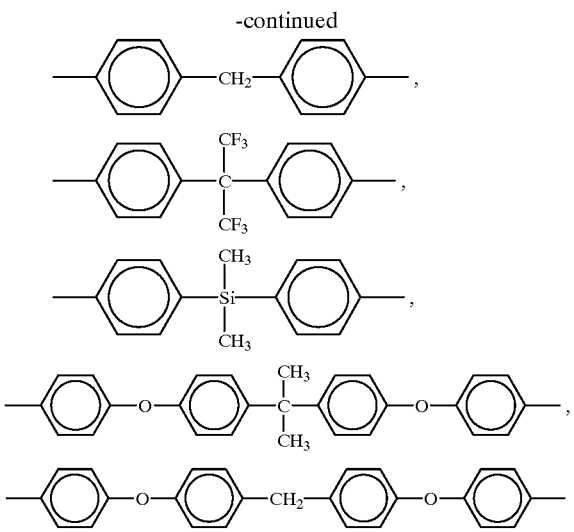

Any of these (meth)acrylate compound may be used alone or in combination of two or more. The (meth)acrylate compound may usually be mixed in an amount of from 0.0001 to 5 parts by weight, preferably from 0.001 to 3 parts by weight, and more preferably from 0.01 to 1 part by weight, based on 100 parts by weight of the component-(A) organopolysiloxane.

(E) Acetylene Alcohol Compound or Derivative Thereof:

As an optional component, the composition of the present invention may be mixed, with a component-(E) acetylene alcohol compound or its modified compound, modified with a silane or siloxane. This component (E) functions as a cure retarding agent (a reaction inhibitor for the platinum catalyst), and may preferably be added especially when a long-term storage stability is required.

The acetylene alcohol compound may be any of those in which an ethynyl group and a hydroxyl group are present in the same molecule. It is preferable for the ethynyl group and hydroxyl group to be bonded to the same carbon atom. As specific examples of the compound, it may include the following compounds.

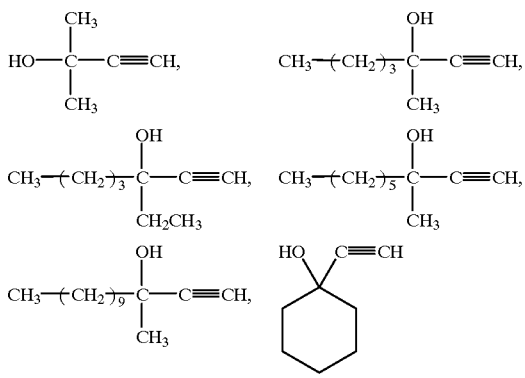

The modified compound of the acetylene alcohol compound, modified with a silane or siloxane is an acetylene alcohol compound the hydroxyl group of which has combined with the silane or siloxane moiety in such a form that it has been converted into an Si—O—C linkage. It may include, e.g., the following compounds.

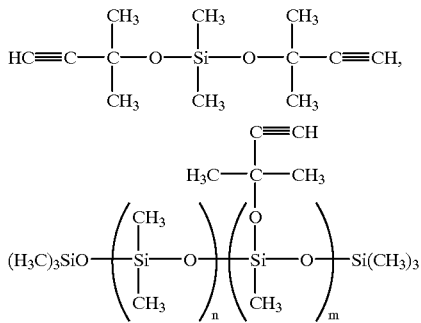

wherein n is an integer of 0 to 50, and preferably 3 to 20; and m is an integer of 1 to 50, and preferably 3 to 20.

The component (E) may be mixed in a quantity effective for attaining the desired storage stability. Stated specifically, it may be in an amount of from 0 to 3 parts by weight, usually from 0.001 to 3 parts by weight, and preferably from 0.01 to 1 part by weight, based on 100 parts by weight of the component-(A) organopolysiloxane.

As cure retarding agents, in addition to the acetylene alcohol compound, it is conventionally known to use vinyl-group-containing polysiloxanes, triallyisocyanurates, alkyl maleates, hydrogen peroxides, tetramethylethylenediamine, benzotriazole, and mixtures of any of these. Of these cure retarding agents, the component (E) specified especially in the present invention brings out the sufficient storage stability and the rapid-curing performance in a well balanced state when used in combination with the component (D).

Other Optional Components:

In addition to the foregoing components (A) to (E), the composition of the present invention may further be mixed with additives including reinforcing silica fillers such as fumed silica and precipitated silica; non-reinforcing fillers such as quarts powder, diatomaceous earth and calcium carbonate; colorants such as inorganic pigments (such as cobalt blue) and organic pigments; and thermal resistance/flame retardance improvers such as cerium oxide, zinc carbonate, manganese carbonate, red iron oxide, titanium oxide and carbon black; any of which may be mixed in an amount that does not damage the effect of the present invention. For the purpose of providing a conduction stability, it is also possible to mix powdery, whiskery or structurally grown carbon black or graphite.

Uses:

The composition of the present invention is useful as adhesives used around electric and electronic parts and around vehicle parts, impression materials, and materials for silicone rubber molded products (such as LIMS).

EXAMPLES

Examples and Comparative Examples are given below. The present invention is by no means limited by these Examples. In the following, Me and Vi refer to a methyl group and a vinyl group, respectively.

Examples 1 to 10 & Comparative Examples 1 to 6

The following components were mixed according to the formulation shown in Tables 1 and 2, to prepare one-part type addition-curable silicone rubber compositions. The storage stability and curing performance of each composition were evaluated by the following test methods.

Results obtained are also shown in Tables 1 and 2.

Alkenyl-Group-Containing Organopolysiloxanes

V—S×1

A vinyl-group-containing organopolysiloxane (viscosity at 25° C.: 5,050 cSt) represented by the formula:

V—S×2

A vinyl-group-containing organopolysiloxane (viscosity at 25° C.: 510,000 cSt) represented by the formula:

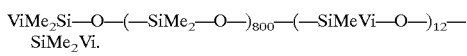

Organohydrogenpolysiloxane

H—S×

An organohydrogenpolysiloxane (viscosity at 25° C.: 46 cSt) 5 represented by the formula:

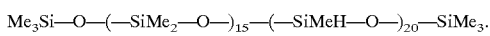

Platinum Catalyst

A toluene solution of 1,3-divinyl-1,1,3,3-tetramethyldisiloxane platinum complex (containing 0.5% by weight of platinum metal).

Cure Retarding Agent

Retarding agent 1

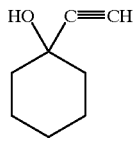

(50% by weight toluene solution)

Retarding agent 2

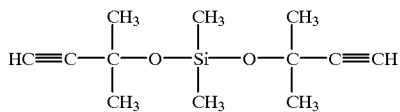

-continued

Retarding agent 3

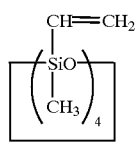

Retarding agent 4

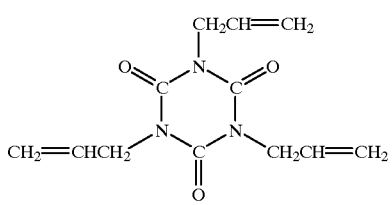

(Meth)Acrylate Compound

Acrylate 1 (melting point: -71° C.)

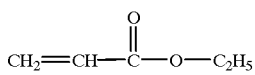

Acrylate 2 (melting point: 60° C.)

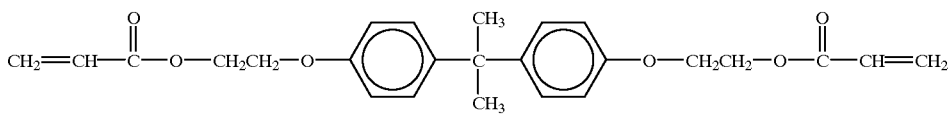

Acrylate 3 (melting point: 93° C.)

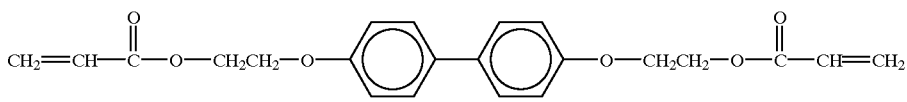

Test Methods

Storage Test:

Each composition is allowed to stand at 5° C. or 25° C. in a 100 ml hermetically closed glass bottle, and days until the numerical value of its viscosity has doubled the value immediately after its preparation are determined, which are used as an index of the evaluation of storage stability.

Curing Test:

A rheometer is used. Each composition is heated at 80° C. or 100° C., and the time (T10) from the starting of heating until the beginning of cure is measured.

TABLE 1

|  | Example | | | | | | | | | |
|---|---|---|---|---|---|---|---|---|---|---|
|  | 1 | 2 | 3 | 4 | 5 | 6 | 7 | 8 | 9 | 10 |
| V-Sx1 | 100 | 100 | 100 | 100 | 100 | 100 | 100 | 100 | — | — |
| V-Sx2 | — | — | — | — | — | — | — | — | 100 | 100 |
| Fumed silica | 10 | 10 | 10 | 10 | 10 | 10 | 10 | 10 | 10 | 10 |
| Platinum catalyst | 0.1 | 0.1 | 0.1 | 0.1 | 0.1 | 0.1 | 0.1 | 0.1 | 0.1 | 0.1 |
| Retarding agent 1 | 0.15 | 0.12 | — | — | — | — | — | — | 0.15 | 0.12 |
| Retarding agent 2 | — | — | 0.15 | 0.12 | — | — | — | — | — | — |
| Retarding agent 3 | — | — | — | — | 0.1 | 0.1 | — | — | — | — |
| Retarding agent 4 | — | — | — | — | — | — | 0.14 | 0.12 | — | — |
| H-Sx | 4 | 4 | 4 | 4 | 4 | 4 | 4 | 4 | 4 | 4 |
| Acrylate 1 | — | — | — | — | — | — | — | — | — | — |
| Acrylate 2 | 0.1 | — | 0.1 | — | 0.1 | — | 0.1 | — | 0.1 | — |
| Acrylate 3 | — | 0.1 | — | 0.1 | — | 0.1 | — | 0.1 | — | 0.1 |
| Storage stability (days) | | | | | | | | | | |
| 5° C. | 320 | 350 | 303 | 330 | 7 | 7 | 260 | 270 | 240 | 260 |
| 25° C. | 99 | 130 | 95 | 140 | 2 | 2 | 62 | 60 | 65 | 70 |

TABLE 1-continued

| | Example | | | | | | | | | |
|---|---|---|---|---|---|---|---|---|---|---|
| | 1 | 2 | 3 | 4 | 5 | 6 | 7 | 8 | 9 | 10 |
| Curing Performance (minutes) | | | | | | | | | | |
| 80° C. | 75 | 23 | 64 | 26 | 12 | 13 | 65 | 31 | 65 | 23 |
| 100° C. | 15 | 11 | 16 | 12 | 6 | 7 | 21 | 23 | 12 | 10 |

TABLE 2

| | Comparative Example | | | | | |
|---|---|---|---|---|---|---|
| | 1 | 2 | 3 | 4 | 5 | 6 |
| V-Sx1 | 100 | 100 | 100 | 100 | 100 | — |
| V-Sx2 | — | — | — | — | — | 100 |
| Fumed silica | 10 | 10 | 10 | 10 | 10 | 10 |
| Platinum catalyst | 0.1 | 0.1 | 0.1 | 0.1 | 0.1 | 0.1 |
| Retarding agent 1 | 0.1 | — | — | — | 0.1 | 0.1 |
| Retarding agent 2 | — | 0.1 | — | — | — | — |
| Retarding agent 3 | — | — | 0.6 | — | — | — |
| Retarding agent 4 | — | — | — | 1.5 | — | — |
| H-Sx | 2.5 | 2.5 | 2.5 | 2.5 | 2.5 | 4 |
| Acrylate 1 | — | — | — | — | 0.1 | — |
| Acrylate 2 | — | — | — | — | — | — |
| Acrylate 3 | — | — | — | — | — | — |
| Storage stability (days) | | | | | | |
| 5° C. | 310 | 305 | 5 | 250 | 5 | 205 |
| 25° C. | 95 | 91 | 2 | 86 | 2 | 62 |
| Curing performance (minutes) | | | | | | |
| 80° C. | 92 | 93 | 15 | 80 | 13 | 86 |
| 100° C. | 36 | 38 | 9 | 40 | 6 | 31 |

As described above, the addition-curable silicone rubber composition of the present invention has both a good storage stability and a rapid-curing performance in a well balanced state. Hence, the composition has a high workability and is expected to greatly contribute to an improvement in productivity.

What is claimed is:

1. An addition-curable silicone rubber composition comprising:

(A) an organopolysiloxane containing in one molecule at least two alkenyl groups bonded to silicon atoms, represented by the average compositional formula (1):

$$R^1_a R^2_b SiO_{(4-a-b)/2}$$

wherein $R^1$ represents a substituted or unsubstituted monovalent hydrocarbon group containing no aliphatic unsaturated bond; $R^2$ represents an alkenyl group; and a is a number ranging from 0.96 to 2.00, b is a number ranging from 0.0001 to 0.5, and a and b satisfy a+b=1.90 to 2.04;

(B) an organohydrogenpolysiloxane containing in one molecule at least two hydrogen atoms bonded to silicon atoms, represented by the average compositional formula (2):

$$R^3_c H_d SiO_{(4-c-d)/2}$$

wherein $R^3$ represents a substituted or unsubstituted monovalent hydrocarbon group containing no aliphatic unsaturated bond; and c is a number ranging from 0.70 to 2.0, d is a number ranging from 0.005 to 1.0, and c and d satisfy c+d=0.8 to 3.0;

(C) a platinum catalyst; and (D) a (meth)acrylate compound having a structure represented by the formula:

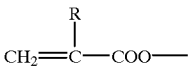

wherein R stands for a hydrogen atom or a methyl group therein and having a melting point of 40° C. or above.

2. The composition of claim 1, wherein the component-(A) organopolysiloxane is a straight-chain diorganopolysiloxane whose molecular chain is terminated with triorganosiloxyl groups at both terminals and backbone chain is substantially formed of the repetition of diorganosiloxane units, and the alkenyl groups of which are bonded to at least silicon atoms at molecular chain terminals.

3. The composition of claim 1, wherein;

the component (B) is present in such an amount that the number of the hydrogen atoms bonded to silicon atoms (SiH groups) present in the component (B) or in the whole organohydrogenpolysiloxanes where other organohydrogen polysiloxanes other than the component (B) are present, is from 0.4 to 10 per one alkenyl group contained in the component (A);

the component-(C) platinum catalyst is present in a quantity effective as a catalyst; and the component-(D) (meth)acrylate compound is present in an amount of from 0.0001 part by weight to 5 parts by weight based on 100 parts by weight of the component (A).

4. The addition-curable silicone rubber composition according to claim 1, which further comprises (E) an acetylene alcohol compound or an acetylene alcohol compound the alcoholic hydroxyl group of which has been modified with a silane or siloxane.

5. The composition according to claim 4, wherein the component-(E) acetylene alcohol compound is selected from the group consisting of an acetylene alcohol compound in which an ethynyl group and a hydroxyl group are bonded to the same carbon atom and a modified compound thereof the alcoholic hydroxyl group of which has been modified with a silane or siloxane.

6. The composition according to claim 4, wherein said acetylene alcohol compound or modified compound thereof is selected from the group consisting of compounds of the formulas:

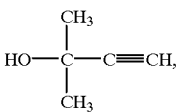 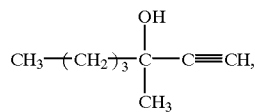

-continued

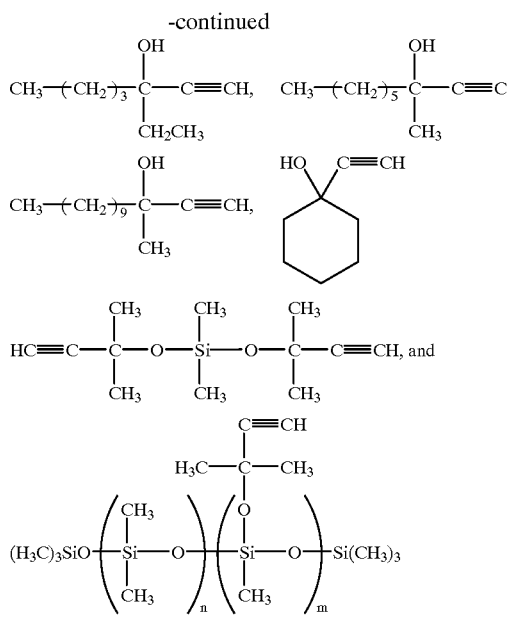

wherein n is an integer of 0 to 50 and m is an integer of 1 to 50.

7. The composition according to claim 4, wherein the component-(E) is present in an amount of from 0.001 part by weight to 5 parts by weight based on 100 parts by weight of the component-(A) organopolysiloxane.

8. A cured product obtained by curing the composition as defined in claim 1.

9. An addition-curable silicone rubber composition comprising:

(A) an organopolysiloxane containing in one molecule at least two alkenyl groups bonded to silicon atoms, represented by the average compositional formula (1):

wherein $R^1$ represents a substituted or unsubstituted monovalent hydrocarbon group containing no aliphatic unsaturated bond; $R^2$ represents an alkenyl group; and a is a number ranging from 0.96 to 2.00, b is a number ranging from 0.0001 to 0.5, and a and b satisfy a+b=1.90 to 2.04;

(B) an organohydrogenpolysiloxane containing in one molecule at least two hydrogen atoms bonded to silicon atoms, represented by the average compositional formula (2):

wherein $R^3$ represents a substituted or unsubstituted monovalent hydrocarbon group containing no aliphatic unsaturated bond; and c is a number ranging from 0.70 to 2.0, d is a number ranging from 0.005 to 1.0, and c and d satisfy c+d=0.8 to 3.0;

(C) a platinum catalyst; and (D) a (meth)acrylate compound having a melting point of 40° C. or above, said component-(D) (meth)acrylate compound having a structure containing 1 to 4 aromatic ring(s) in the molecule.

10. The composition of claim 9, wherein the structure containing 1 to 4 aromatic ring(s) is represented by the formula:

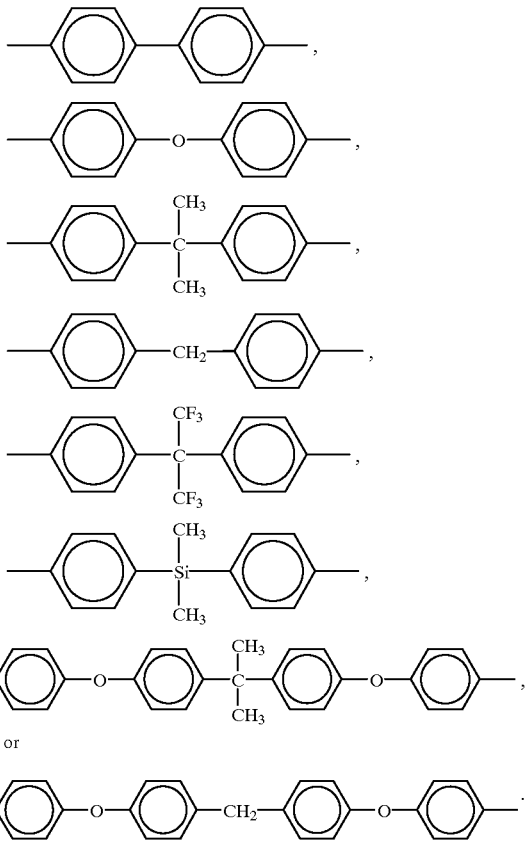

or

11. An addition-curable silicone rubber composition comprising:

(A) an organopolysiloxane containing in one molecule at least two alkenyl groups bonded to silicon atoms, represented by the average compositional formula (1):

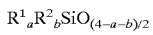

wherein $R^1$ represents a substituted or unsubstituted monovalent hydrocarbon group containing no aliphatic unsaturated bond; $R^2$ represents an alkenyl group; and a is a number ranging from 0.96 to 2.00, b is a number ranging from 0.0001 to 0.5, and a and b satisfy a+b=1.90 to 2.04;

(B) an organohydrogenpolysiloxane containing in one molecule at least two hydrogen atoms bonded to silicon atoms, represented by the average compositional formula (2):

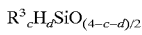

wherein $R^3$ represents a substituted or unsubstituted monovalent hydrocarbon group containing no aliphatic unsaturated bond; and c is a number ranging from 0.70 to 2.0, d is a number ranging from 0.005 to 1.0, and c and d satisfy c+d=0.8 to 3.0;

(C) a platinum catalyst; and (D) a (meth)acrylate compound having a melting point of 40° C. or above, said component-(D) (meth)acrylate compound being represented by the following formula (3):

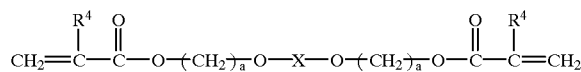

(3)

wherein $R^4$ represents a hydrogen atom or a methyl group; X represents a divalent hydrocarbon group containing 1 to 4 aromatic ring(s), and having 6 to 30 carbon atoms, which may contain in the structure at least one atom selected from the group consisting of an oxygen atom, a silicon atom and a fluorine atom; and a represents an integer of 1 to 6.

* * * * *